(12) United States Patent
Ávila Aparicio et al.

(10) Patent No.: US 8,332,081 B2
(45) Date of Patent: Dec. 11, 2012

(54) METHODS AND SYSTEMS FOR REDUCING THE PHENOMENON OF STRUCTURAL COUPLING IN THE CONTROL SYSTEM OF AN IN-FLIGHT REFUELLING BOOM

(75) Inventors: Carlos Ávila Aparicio, Madrid (ES); Daniel Peláez Fernández, Madrid (ES); Melchor Barrio Mendez, Madrid (ES)

(73) Assignee: EADS Construcciones Aeronauticas, S.A., Madrid (ES)

( * ) Notice: Subject to any disclaimer, the term of this patent is extended or adjusted under 35 U.S.C. 154(b) by 1121 days.

(21) Appl. No.: 12/177,404

(22) Filed: Jul. 22, 2008

(65) Prior Publication Data
US 2009/0292406 A1 Nov. 26, 2009

(30) Foreign Application Priority Data
May 22, 2008 (ES) .................................. 200801498

(51) Int. Cl.
*G06F 19/00* (2006.01)
(52) U.S. Cl. ......................................... 701/3; 244/135 A
(58) Field of Classification Search .......... 701/3; 244/10, 244/135, 135 A; 345/8; 357/630; *G06F 19/00*
See application file for complete search history.

(56) References Cited

U.S. PATENT DOCUMENTS

| | | | | |
|---|---|---|---|---|
| 3,917,196 A * | 11/1975 | Pond et al. ...................... 342/23 |
| 4,298,176 A * | 11/1981 | Kendall ..................... 244/135 A |
| 5,109,345 A * | 4/1992 | Dabney et al. ................ 701/226 |
| 5,499,784 A * | 3/1996 | Crabere et al. ............ 244/135 A |
| 5,906,336 A * | 5/1999 | Eckstein .................... 244/135 A |
| 6,651,933 B1 * | 11/2003 | von Thal et al. ............... 244/136 |
| 7,137,597 B2 * | 11/2006 | Schuster et al. ........... 244/135 A |
| 7,147,186 B2 * | 12/2006 | Adelson ..................... 244/135 A |
| 7,475,852 B2 * | 1/2009 | Hewitt et al. .............. 244/135 A |
| 7,769,543 B2 * | 8/2010 | Stecko et al. .................. 701/476 |
| 7,850,121 B2 * | 12/2010 | Powell ....................... 244/135 A |
| 7,938,369 B2 * | 5/2011 | Matheny ................... 244/135 A |
| 8,033,506 B2 * | 10/2011 | Greene ...................... 244/135 A |
| 8,042,771 B2 * | 10/2011 | Matos et al. .............. 244/135 R |
| 8,055,526 B2 * | 11/2011 | Blagg et al. .................. 705/7.14 |
| 8,074,931 B2 * | 12/2011 | Schroeder ................. 244/135 A |
| 8,074,935 B2 * | 12/2011 | Gryniewski et al. ........ 244/172.5 |
| 8,172,181 B2 * | 5/2012 | Burgess ..................... 244/135 B |
| 2003/0136874 A1 * | 7/2003 | Gjerdrum ........................ 244/10 |
| 2003/0209633 A1 * | 11/2003 | Thal et al. ................. 244/135 A |
| 2008/0210808 A1 * | 9/2008 | Adelson .......................... 244/10 |
| 2008/0302916 A1 * | 12/2008 | Speer ........................ 244/135 A |

* cited by examiner

*Primary Examiner* — Tuan C. To
(74) *Attorney, Agent, or Firm* — Ladas & Parry LLP

(57) ABSTRACT

A method for controlling a boom (11) for in-flight refueling for increasing the damping of its displacement by means of a movement of control surfaces (16) related to its angular velocity, that comprises the following steps: a) At least two sensors (32, 33) are arranged in two sections of the boom (11) positioned on opposite sides of the valley (41) of the dominant flexible mode (40) for any length of its telescopic extension (12) and the moduli (D1, D2) of the angular deformations of the dominant flexible mode (40) are determined in them; b) The angular velocities (Q1, Q2) are obtained from the data supplied by said sensors (32, 33); c) The angular velocity Q unaffected by the resonance of the dominant flexible mode (40) is obtained as a function of said angular velocities (Q1, Q2) and said moduli (D1, D2), which eliminates the component of the elastic movement of the dominant flexible mode (40). The invention also relates to a control system and a computer program for executing said method.

7 Claims, 6 Drawing Sheets

METHODS AND SYSTEMS FOR REDUCING THE PHENOMENON OF STRUCTURAL COUPLING IN THE CONTROL SYSTEM OF AN IN-FLIGHT REFUELLING BOOM

FIELD OF THE INVENTION

The present invention relates to an in-flight refueling system for aircraft, and more specifically to a method of reducing the phenomenon of structural coupling in the system for controlling the movement thereof.

BACKGROUND

One of the methods currently used for the in-flight refueling of aircraft comprises the use of a boom provided with an internal section with capacity for telescopic extension via which aircraft fuel is transferred by means of an internal line from the tanker aircraft to the receiving aircraft. The boom is connected to the tanker aircraft by means of a hinged system provided with two degrees of freedom and is equipped with a set of movable aerodynamic surfaces or fins which, by means of independent variations of the incidence of each of them relative to the incident air flow, enables the operator of the system to position the boom in the conditions of desired attitude. The limit of the attitude envelope attainable depends on the maximum capacity of said fins for generating forces that make it possible to balance the set of aerodynamic, inertial and gravitational effects relative to the linkage of the system.

Movement of the boom from one position of equilibrium in space to another is effected by using these fins, with their initial and final positions corresponding to those that balance the boom in both spatial conditions. Said movement is a movement of rotation about each of the two axes defined by the two degrees of freedom of the linkage (elevation-roll or elevation-azimuth). The dynamic characteristics of said system correspond to a modal description characterized by a very low damping ratio. Consequently this movement generated by a direct change of fins from that corresponding to equilibrium in one spatial position to another spatial position involves an oscillatory movement of the boom with very little damping.

To accomplish the precise and predictable operation of tracking of the refueling socket or receiver of the receiving aircraft, without running the risk of causing an impact between the recipient and the boom, it is necessary for the movement of the latter to be sufficiently damped.

For achieving this aim, the prior art employs electrical control systems (fly-by-wire), with functions for increasing stability and control, in such a way that the dynamics of movement, by means of said control system, has the desired characteristics for performing the task of tracking the receiver. An electrical flight control system comprises:

Elements for measuring movement and/or position of the platform to be controlled, called sensors.
  A control element in the operator's cabin, generally a joystick, for controlling the movements required by the operator.
  Actuating elements that generate the movement of the control elements of the platform, in this case the aerodynamic surfaces.
  An on-board computer or calculating system with on-board software that includes algorithms which, when supplied with the orders generated by the operator, together with the measurements of movement and/or position of the equipment, generate a command for movement of the control elements, via their actuating systems.

The algorithms implemented in the on-board computer are directed towards modification of the natural dynamics of the equipment to be controlled as well as provision of other functions such as a manoeuvre or position demand system.

In the case of the in-flight refueling boom system, the control algorithms must perform a basic function of increasing the damping of the basic equipment, from a very low value, close to zero, up to a value compatible with a rapid and predictable response without oscillations or exceeding of the final value demanded. This desired response is associated with appropriate operating conditions for performing the task without requiring significant compensation of the dynamics of the equipment by the operator.

The increase in damping is achieved by means of a command for movement of the aerodynamic fins so that they generate a load, producing an overall force on the boom that tends to oppose the angular movement of the latter. The damping effect is achieved by means of a fin movement of a magnitude related to the angular velocity (normally a proportional relation) and opposite in direction to this angular movement. The basic characteristics of the refueling system necessitate increased damping of the angular movements defined by both linkages (elevation-roll or elevation-azimuth).

Owing to the fact that in the design of the refueling probe the length of the probe predominates, as well as its lowest possible weight, the structural characteristics of the boom are characterized by particular modes with extremely low frequencies. These frequencies are close to the natural frequencies that define the movement of the boom as a rigid solid about the linkage and the frequency of control thereof used by the operator for controlling said movement. These flexible modes are also characterized by a very low damping ratio, exhibiting a very characteristic resonance frequency with a high level of amplification of the response if excited at said natural frequency.

The flexible modes of the probe are excited when subjected to external loads, such as the forces generated by the fins in the process for controlling the position of the boom. The excitation through movement of the aerodynamic surfaces has two origins: one due to the change in aerodynamic load on changing its angle of incidence, the other due to the inertial loads caused by rotation about its axis of rotation. In the case of the in-flight refueling boom, the effect of generation of aerodynamic load is dominant.

The elements of the flight control system that detect the movement of the boom measure the movement of the section of the boom where the measuring elements are located, detecting both the movement as a rigid solid, the control object thereof, and the movement associated with the flexible vibration of the structure.

Therefore the control algorithms are fed with the rigid and elastic movements, which are converted by these algorithms into a demand for movement of the aerodynamic fins. By their movement, these in their turn generate new forces which in addition to acting on the movement of the boom as a rigid solid, once again excite the structural modes. This combination of rigid and elastic movements is fed again to the control system, and a coupling effect is produced. The effect of coupling of the flexible movement of the structure with a control function as a rigid solid is called "structural coupling".

The excitation of the structure through movement of the aerodynamic fins decreases as the frequency increases, owing to the natural attenuation of the actuating system, as well as the intrinsic capacity for generation of aerodynamic force.

This effect of feedback of the movement must be such that the resultant dynamics are stable, and must moreover guarantee a margin relative to the condition of instability of the complete system, formed by the equipment to be controlled plus its control system. In the qualification of system airworthiness, minimum stability margins are specified both in the control of the rigid modes, and in the stability of the flexible modes.

In the phenomenon of structural coupling, the closeness of the rigid and the flexible control frequencies is critical, therefore the first flexible modes are of low frequency and are relevant to the phenomenon. The dominant flexible mode will be regarded as that having greatest influence on the problem of structural coupling, i.e. by its frequency, by a low damping ratio, by excitation due to the deflection of aerodynamic fins or by its detection by means of the elements for measuring movement or position.

A first measure for reducing this phenomenon is to locate the measuring systems in positions that are not altered by the movement due to the flexible modes relevant to the phenomenon, or even to locate the control surfaces at a point of less excitation of the structure. Whereas the location of the elements for measuring movement can at times have some flexibility during design, the positioning of the control surfaces has to satisfy the capacity for control and balancing of the equipment. In any case, positioning of the measuring elements in a position that is not altered by the movement due to the relevant flexible modes is not a robust solution owing to the change of these modes with possible changes in configuration of the equipment, as is the case with the movement of extension of the telescopic tube in the case of the refueling boom.

In the case of the boom, the aerodynamic fins must be positioned to be sufficiently remote from the linkage to produce a balancing moment about the linkage by means of a force that is as small as possible. The measuring elements can be located in the sections that interfere as little as possible with the transverse section of the boom, so that the aerodynamic drag does not increase significantly. These can be positioned at the root of the boom and in the section with the fins.

The usual techniques for avoiding the phenomenon of structural coupling are based on performing signal filtering, whether those obtained via the measuring systems, and the signals for command of fin movement, in such a way that there is no change in content of the signal with respect to measurement of rigid movement. The negative effect of said filtering is that the more we wish to attenuate the content of the flexible signal at high frequency, the more phase lag is induced in the signal in the range of control frequencies as a rigid solid. This phase lag means that the maximum damping ratio that could be obtained by means of feedback is limited. The greater the phase lag, the lower will be the maximum damping ratio attainable by means of feedback, and therefore the handling qualities that can be achieved will be poorer.

In the case of the in-flight refueling probe, the closeness of the flexible frequencies and the control frequencies means that the usual method of filtering cannot be used for simultaneously achieving the objectives of guaranteeing the required stability margins and providing adequate handling characteristics for performing the task of tracking of the receiver. The present invention aims to correct this shortcoming.

SUMMARY OF THE INVENTION

One aim of the present invention is to provide methods and systems of control of a boom for in-flight refueling of a receiving aircraft from a tanker aircraft that make it possible to increase the length of the boom and/or reduce its weight.

Another aim of the present invention is provide methods and systems for controlling a boom for in-flight refueling of a receiving aircraft from a tanker aircraft that achieve some stability margins in the flexible modes that facilitate their displacements.

In a first aspect, these and other aims are achieved with a method for controlling a boom for in-flight refueling of a receiving aircraft from a tanker aircraft that is provided with a telescopic extension and aerodynamic control surfaces by means of which a function of increase in damping of its displacement is performed by means of a movement of said aerodynamic control surfaces of a magnitude related to the angular velocity of the boom and in a direction opposite to that of its displacement, that includes a calculating system for obtaining the angular velocity Q unaffected by the resonance of the flexible mode that comprises the following steps:

At least two position and/or movement sensors are arranged in two positions of the boom located on opposite sides of the valley of the dominant flexible mode whatever the length L of the telescopic extension and the moduli D1, D2 of the angular deformations of the dominant flexible mode, are determined in the sections of the boom in which said sensors are located.

The angular velocities Q1, Q2 in the sections of the boom where said at least two sensors are positioned, are obtained from the data provided by the latter.

Said angular velocity Q is obtained as a function of said angular velocities Q1, Q2 and said moduli D1, D2 that eliminates the component of the elastic movement of the dominant flexible mode.

In a preferred embodiment of the method according to the present invention, said moduli D1, D2 are determined from measurements performed on the boom proper.

In another preferred embodiment of the method according to the present invention, said moduli D1, D2 are obtained from calculations performed with simulation tools. This makes it possible, at least partly, to develop the method before a physical realization of the boom is available.

In another preferred embodiment of the method according to the present invention, compensation is applied for a possible delay in obtaining said angular velocities Q1, Q2 to guarantee that there is, between them, a phase lag of 180° in the natural frequency of the dominant flexible mode. This ensures that the velocity Q obtained using the method according to the present invention is reliable.

In another preferred embodiment of the method according to the present invention, said velocity Q is obtained as a weighted sum of the angular velocities Q1, Q2 obtained from the data supplied by said sensors using, for each of them, weighting factors X1, X2 that are directly proportional to the moduli D2, D1, respectively, of the angular deformations of the dominant flexible mode in the sections of the boom where the opposite sensor is positioned and inversely proportional to the sum of said moduli D1, D2. This makes it easier to obtain the velocity Q necessary for performing the aforesaid function of increase in damping.

In another preferred embodiment of the method according to the present invention, an additional step of validation of said weighting factors X1, X2 is included, verifying that they coincide with those that are obtained on replacing the moduli D1, D2 with the amplitudes A1, A2 of the angular movement of the dominant elastic mode in the sections of the boom where said sensors are positioned at the frequency Fd of the dominant flexible mode relative to the excitation of the aerodynamic surfaces, said amplitudes A1, A2 being obtained by means of measurements performed on the boom in flight. This achieves a guarantee of reliability of the velocity Q obtained by the method according to the present invention.

In a second aspect, these and other objects are achieved with a control system of a device for in-flight refueling of a receiving aircraft from a tanker aircraft that uses a boom, provided with a telescopic extension and aerodynamic control surfaces, that is connected to the tanker aircraft via a mechanical linkage that comprises:

Sensors for measuring parameters of movement and position of said boom and its telescopic extension and in particular at least two sensors arranged on the boom in positions that ensure it is located on opposite sides of the valley of the dominant flexible mode whatever the size of the telescopic extension.

Actuators of said aerodynamic control surfaces.

A computerized system for controlling said actuators on the basis of the instructions supplied by a command unit and the data supplied by said at least two sensors that includes a subsystem for performing a function of increase in damping, by means of a movement of said aerodynamic control surfaces of a magnitude related to the angular velocity of the boom and in the opposite direction, with a computer program for obtaining the angular velocity Q of the boom unaffected by the resonance of the dominant flexible mode as a function of the angular velocities Q1, Q2 obtained from the data supplied by said at least two sensors and of the moduli D1, D2 of the angular deformations of the dominant flexible mode in the sections of the boom in which said at least two sensors are located that eliminates the component of the elastic movement of the dominant flexible mode.

In a preferred embodiment of the system according to the present invention, said moduli D1, D2 are determined from measurements performed on the boom proper.

In another preferred embodiment of the system according to the present invention, said moduli D1, D2 are obtained from calculations performed with simulation tools. This makes it possible, at least partly, to develop the system before a physical realization of the boom is available.

In another preferred embodiment of the system according to the present invention, compensation is applied for any delay in obtaining said angular velocities Q1, Q2 to guarantee that there is, between them, a phase lag of 180° in the natural frequency of the dominant flexible mode. This ensures that the velocity Q obtained using the system according to the present invention is reliable.

In another preferred embodiment of the system according to the present invention, said velocity Q is obtained as a weighted sum of the angular velocities Q1, Q2 obtained from the data supplied by said sensors using, for each of them, weighting factors X1, X2 that are directly proportional to the moduli D2, D1, respectively, of the angular deformations of the dominant flexible mode in the sections of the boom where the opposite sensor is located, and inversely proportional to the sum of said moduli D1, D2. This makes it easier to obtain the velocity Q necessary for performing the aforesaid function of increase in damping.

In a third aspect, these and other objects are achieved with a computer program suitable for executing the method of control mentioned above.

Other characteristics and advantages of the present invention will become clearer from the detailed description that follows, referring to the accompanying drawings.

DETAILED DESCRIPTION OF THE INVENTION

Figure 1:
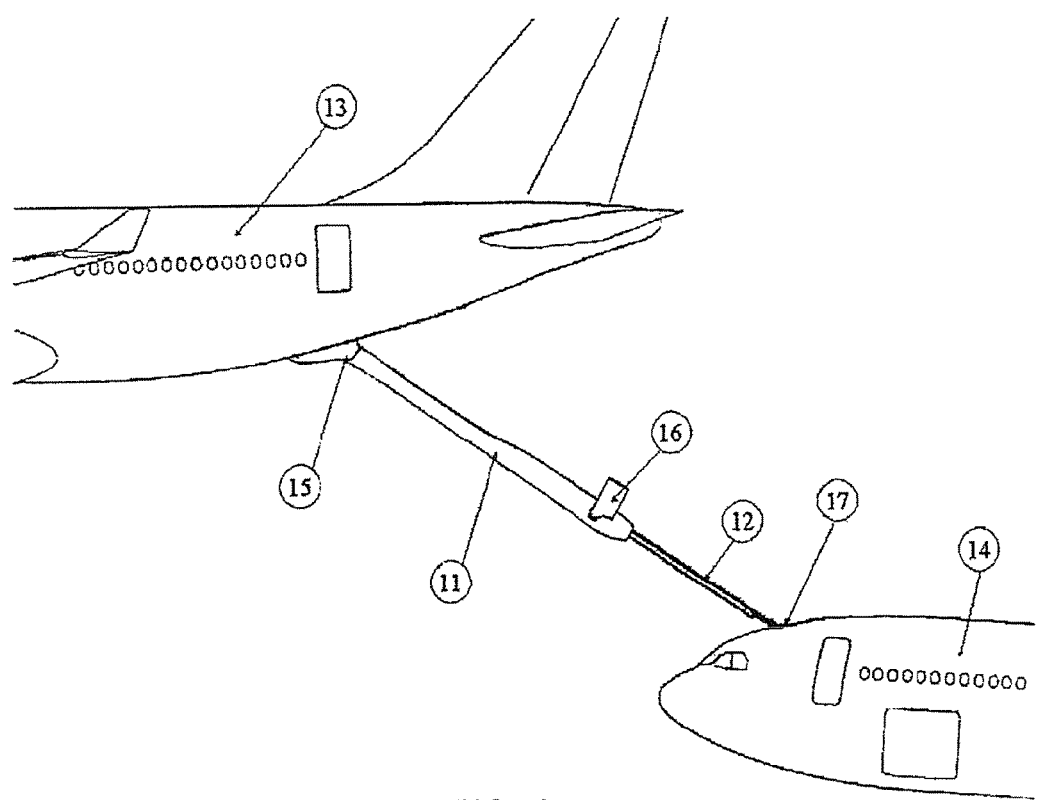
FIG. 1 shows a side view of the type of in-flight refueling system to which the present invention applies.
Figure 2:
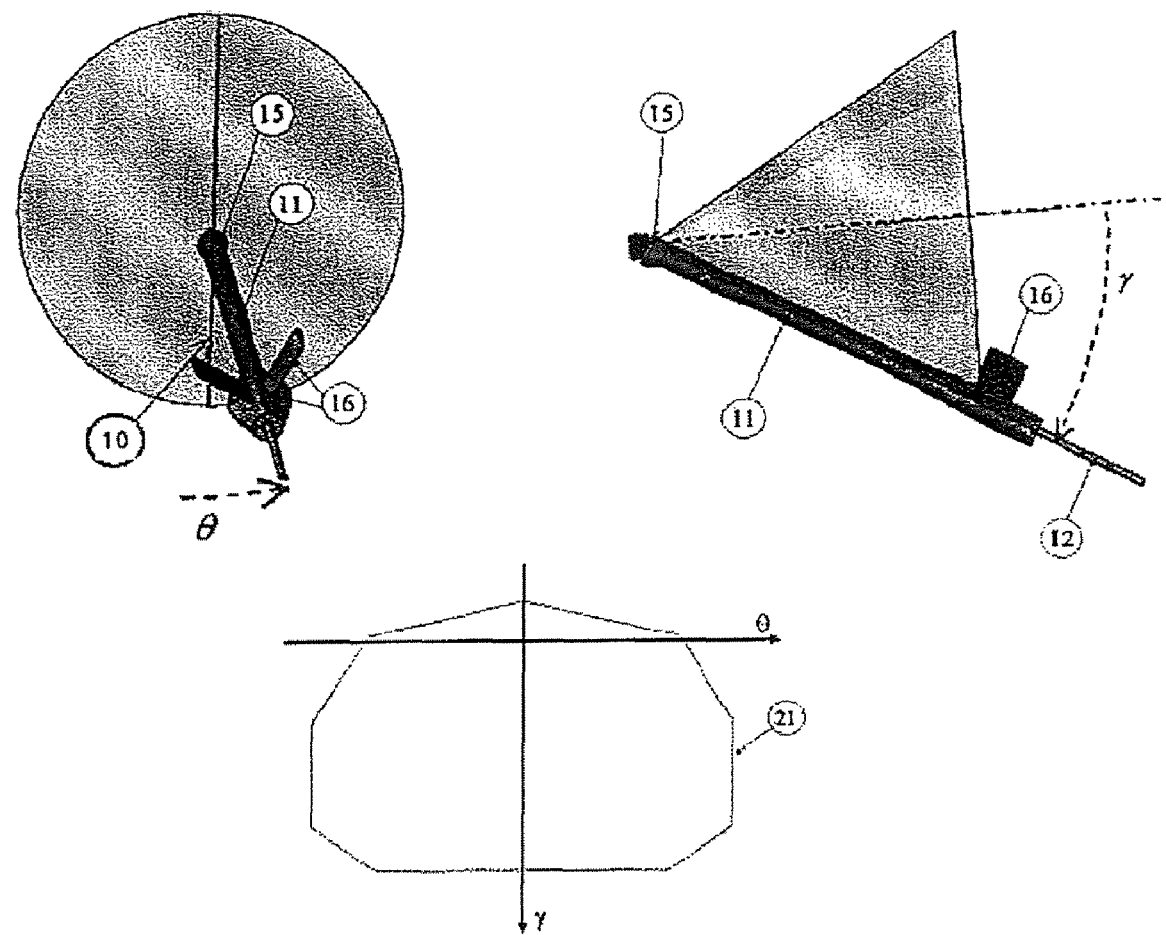
FIG. 2 shows the definition of the angles of movements of an in-flight refueling boom, as well as a sketch of the envelope of angles of elevation and lateral angles of an in-flight refueling boom.
Figure 3:
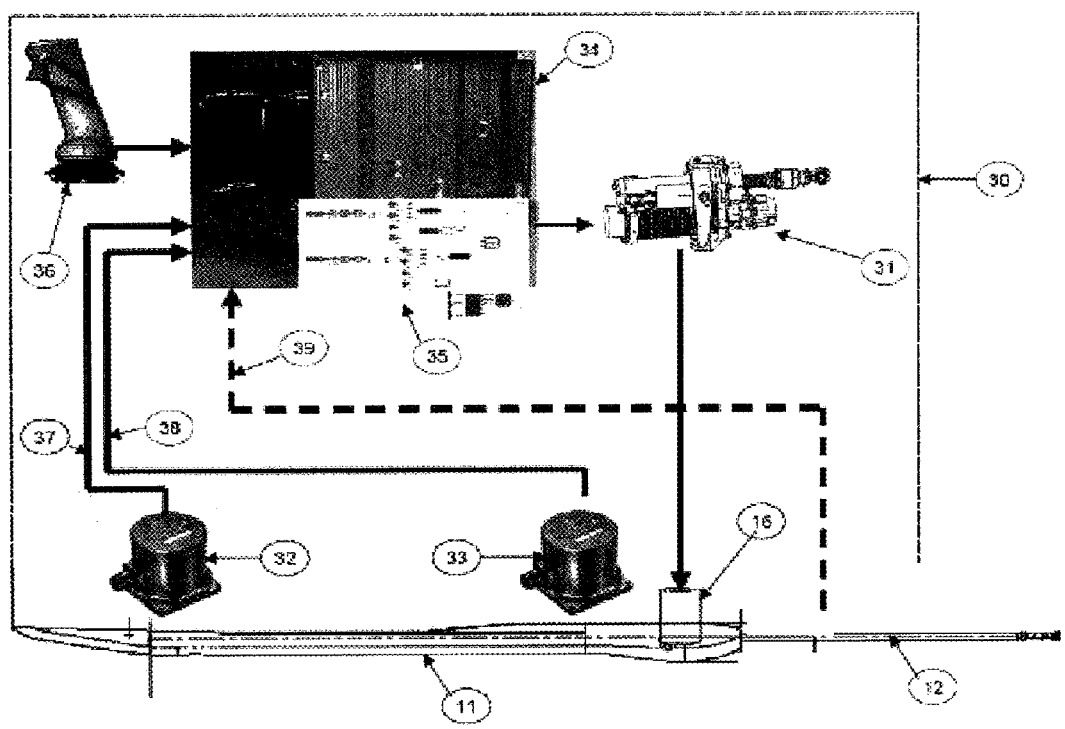
FIG. 3 shows a sketch of the flight control system, with its component parts.

One of the methods currently in use for the in-flight refueling of aircraft comprises the use of a boom 11 provided with a telescopic extension 12, through which fuel is transferred from the tanker aircraft 13 to the receiving aircraft 14, as shown in FIG. 1. The boom 11 is connected to the tanker aircraft 13 by means of a linkage 15 with two degrees of freedom (elevation-roll or elevation-azimuth), and is equipped with aerodynamic control surfaces 16 in the form of movable aerodynamic fins positioned near the end opposite to that of the linkage 15 which, by means of independent variations of the incidence of each fin relative to the incident air flow, enables the operator of the system (not shown) to control the movement of the boom 11 by varying its position in space within a specified envelope 21, said envelope 21 having an elevation γ and a lateral angle θ relative to the plane of symmetry 10 of the tanker aircraft 13, as shown in FIG. 2, corresponding to the rotations about the axes of rotation permitted by the linkage 15.

In the preferred embodiment of the present invention depicted in FIGS. 3-6, the flight control system 30 consists of actuators 31 of the fins 16, sensors 32, 33 located at the ends of the boom 11, a computerized control system 34 that contains control algorithms 35 and a command unit 36 on the part of the operator. The control algorithms take the measurements 37, 38 supplied by the sensors 32, 33 together with the orders generated by the operator via his command unit 36 to generate commands for movement of the fins 16 that are achieved via their actuators 31.

Other measuring elements (not shown) provide information on the flight conditions and the configuration, such as the length L of the extension of the telescopic tube 12.

Figure 4:
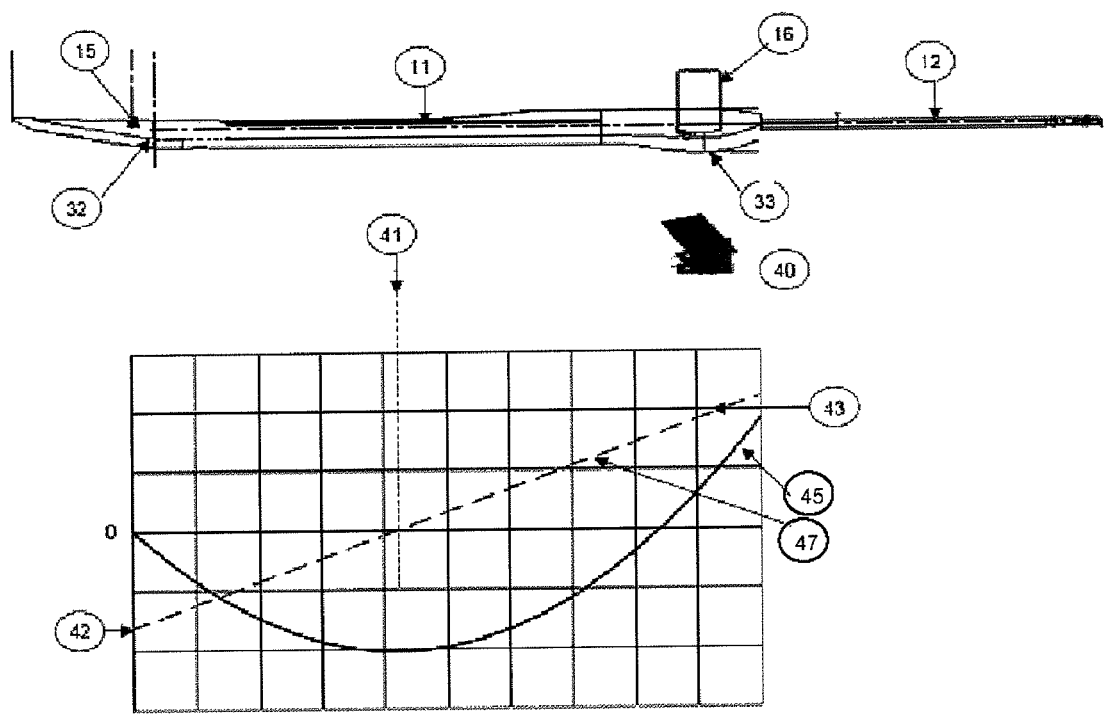
FIG. 4 shows the positioning of the measuring elements of position/movement on the boom in a preferred embodiment of the present invention as well as a diagram of the dominant modal form and the linear and angular displacements of said modal form.

As shown in FIG. 4, the dominant flexible mode of the boom 11 has a modal form 40 with a valley 41 near the central section of the boom 11. The modal form 40 has a maximum linear deformation 45 at the position of valley 41, although its angular deformation is zero. The angular deformation 47 changes sign on either side of valley 41. The moduli of the angular deformations of the sections where sensors 32, 33 are located are given by points 42, 43 on line 47 and the deformations have opposite signs.

The sensors 32, 33 are positioned on either side of valley 41 of the dominant modal form 40, so that the angular deformation on opposite sides of said valley 41 have opposite signs.

The sections of the boom in which said sensors are positioned must be sufficiently distant from the valley 41 of said dominant elastic mode to ensure an appropriate position in the various configurations of telescopic tube 12. Both sections must be at ends opposite to said valley 41, which corresponds to the condition of maximum deformation of the elastic mode and of zero influence with respect to the angular deformation. The sections located in sections to the right and left of the valley have an angular component due to the flexible mode in phase opposition.

Moreover, in the positioning of the sensors 32, 33 it is necessary to take into account the variation in the dominant modal form 40 with the variation in the length L of the extension of the telescopic tube, a factor that causes said modal form to change, in order to comply with the condition of being positioned on opposite sides of said valley 41.

For each rotation defined by the linkage 15 (elevation-roll or elevation-azimuth), two angular velocities are received from each of the sensors 32, 33. Then, two measurements 37, 38, each received from one sensor, are obtained on each axis of rotation. The angular velocities Q1, Q2 can be obtained from the measurements 37, 38 by direct measurement in the case of rotation sensors, by differentiation in the case of position sensors, or by integration in the case of acceleration sensors, and moreover from the algebraic composition for determination of the angular velocity on the axes of rotation (elevation-roll or elevation-azimuth) of the boom 11 about the axes defined by the linkage 15. In addition, each measurement 37, 38 is associated with a transfer process from the sensor to the calculating system and an internal process of acquisition, digitization, consolidation and voting 50.

The angular velocity unaffected by the elastic component Q, according to the present invention, is obtained as the weighted sum of the angular velocities Q1, Q2 obtained from processing the measurements 37, 38 received from the sensors 32, 33. The weighting factors X1, X2 of each angular velocity Q1, Q2 correspond to the modulus of the modal angular deformation in the position of the opposite sensor divided by the sum of the moduli of the deformations in the positions of both sensors, according to the expression:

$Q=Q1*X1+Q2*X2$ where, as shown in FIG. 4:

Q1: angular velocity obtained from signal 37 of sensor 32
Q2: angular velocity obtained from signal 38 of sensor 33
X1: weighting factor of the angular velocity obtained from sensor 32. It is equal to:

$X1=D2/(D1+D2)$

X2: weighting factor of the angular velocity obtained from sensor 33. It is equal to:

$X2=D1/(D1+D2)$

D1: Modulus of the angular deformation of the dominant elastic mode in the section where sensor 32 is located
D2: Modulus of the angular deformation of the dominant elastic mode in the section where sensor 33 is located The relation between the moduli D1, D2 of the flexible angular deflections in the sections where the sensors 32, 33 are located depends solely on the dominant modal form 40 but not on its modal characteristics (frequency and damping) nor on the excitation due to the actuation of the fins 16. The only factor that causes the modal form to vary is the length L of the extension of the telescopic tube 12, therefore the weighting factors X1 and X2 must vary with said length L in the mixing algorithm. The weighting factors X1 and X2 thus obtained have values between zero and one, and are complementary to unity. In this way it is guaranteed that the component of the signal remains unchanged at the rigid control frequencies, where both signals are in phase.

The moduli D1, D2 are determined either by means of measurements performed on the boom proper 11 or by means of any analytical procedure and in particular analytical procedures using simulation tools.

Figure 5:
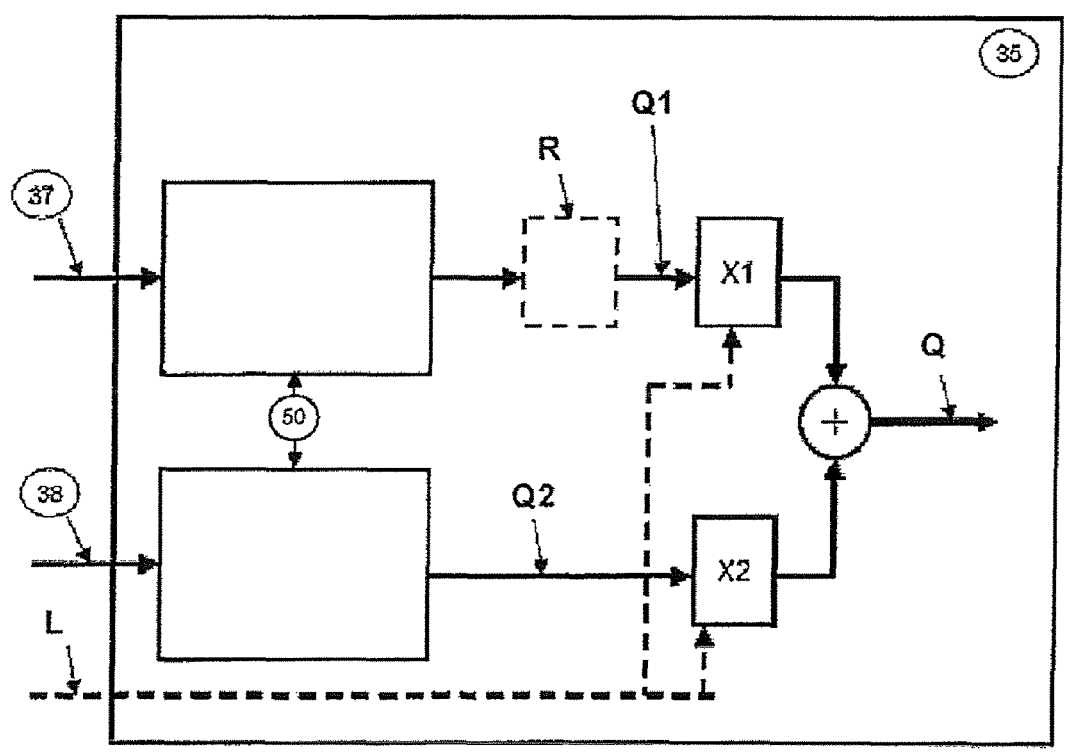
FIG. 5 shows a schematic of the algorithm for mixing the angular velocities derived from the signals received from each measuring element, as well as the delay for compensating the relative process phase lag between the two signals in a preferred embodiment of the present invention.

The mixing algorithm is shown schematically in FIG. 5, within the set of control algorithms 35. The derivation of the angular velocities Q1, Q2 starting from the measurements 37, 38 received from sensors 32, 33 can give rise to a phase lag or additional relative delay between the two angular velocities Q1, Q2. The angular velocities Q1 and Q2 must be preprocessed before they are mixed, adding to the less phase-lagged signal an additional delay R equal to the difference of the delays induced in the generation of the two angular velocities Q1, Q2 on the basis of their measurements 37, 38 so that they are maintained in the condition of phase opposition.

The weighting factors X1, X2 of the angular velocities Q1, Q2 must moreover be verified on the basis of measurements of the specimen in flight by obtaining the frequency responses 62, 63 of the angular velocities Q1, Q2 to the deflection of the aerodynamic fins 16. The weighting factors X1, X2 are obtained similarly on the basis of the amplitudes A1, A2 of said frequency responses 62 and 63 at the natural frequency Fd of the dominant flexible mode 40 by applying the same expression as was used previously:

X1: weighting factor of the angular velocity obtained from sensor 32. It is equal to:

$X1=A2/(A1+A2)$

X2: weighting factor of the angular velocity obtained from sensor 33. It is equal to:

$X2=A1/(A1+A2)$

A1: Amplitude of the angular movement of the dominant elastic mode in the section where sensor 32 is located, at the frequency Fd of the dominant mode 40 relative to the excitation of the fins 16.
The amplitude is expressed in physical units (angle/time v.s. angle) not in dB.
A2: Amplitude of the angular movement of the dominant elastic mode in the section where sensor 33 is located, at the frequency Fd of the dominant mode 40 relative to the excitation of the fins 16.
The amplitude is expressed in physical units (angle/time v.s. angle) not in dB.

Figure 6:
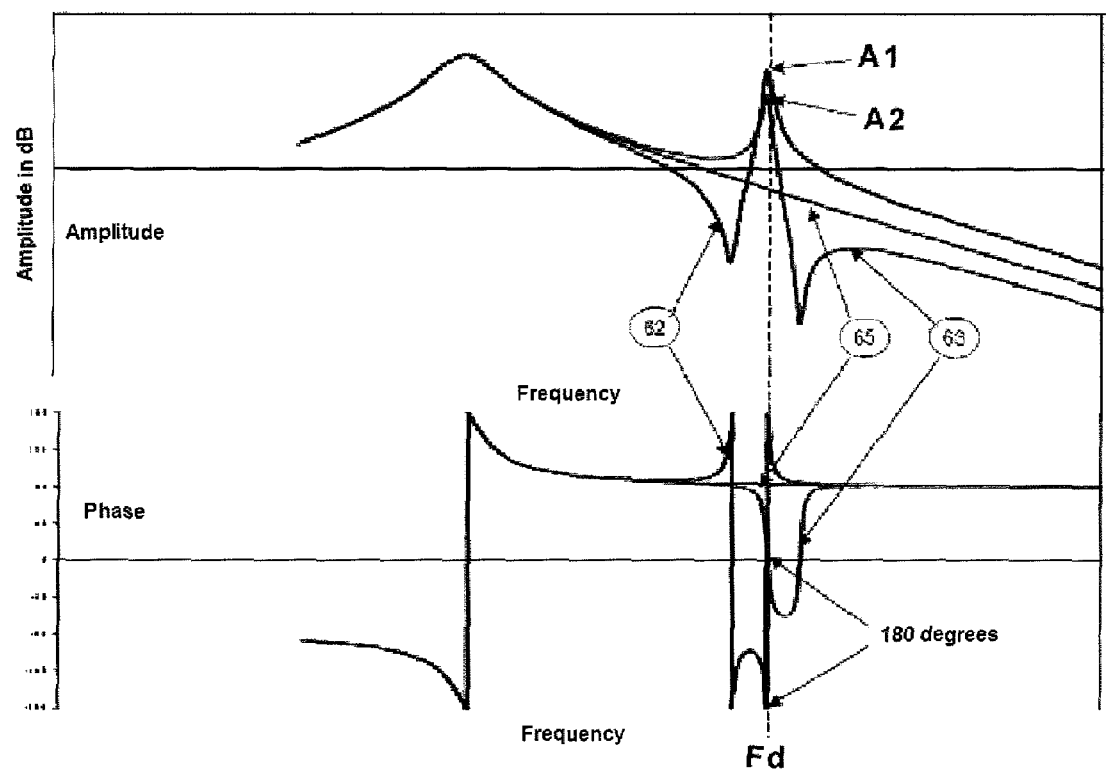
FIG. 6 shows the relation of the frequency responses of the angular velocities obtained from each measuring element and the frequency response of the angular velocity obtained by mixing the signals, in a preferred embodiment of the present invention.

The frequency responses are represented schematically in FIG. 6. This shows the frequency response 65 of the angular velocity unaffected by the elastic component Q compared with the frequency responses 62, 63 of the original angular velocities Q1, Q2 derived from the measurements 37, 38 of the sensors 32 and 33, relative to the deflection of fins 16.

For correct implementation of the mixing algorithm it must be verified that the additional delay R included in the post-processing of the least delayed signal complies with the requirement that both transfer functions 62 and 63 are phase-lagged 180 degrees at the natural frequency Fd of the dominant flexible mode. If this condition is not fulfilled, said delay R must be adjusted appropriately to satisfy said condition. This condition guarantees that the weighted sum of the two angular velocities does not contain an amplification due to structural resonance.

Since this parameter depends solely on delays due to the different processing of the two signals, once adjusted it is a fixed datum that is not subject to variations during operation.

As we have pointed out, the method that we have just described in detail is limited to the obtaining of a suitable feedback signal for an increase in damping that is not affected by the characteristics of the movement of the dominant flexible mode, that is used in the setting of the global system for control of the in-flight refueling boom. The conventional technique of measurement signal filtering and/or of commands to the aerodynamic control surfaces is applied for the rest of the non-dominant flexible modes.

The signal obtained with the method according to the present invention is a measurement of the angular velocity of the boom as a rigid solid that guarantees suppression of the structural resonance effect in the control loop without phase-lag effects in the range of control frequencies as a rigid solid.

The method of obtaining said signal according to the present invention is a robust method since it only depends on the form of the dominant flexible mode and not on exact knowledge of its damping frequency characteristics nor response to excitation generated by the movement of the fins.

Although the present invention has been described entirely in connection with preferred embodiments, it is obvious that modifications that are within the scope of the following claims can be introduced, and it is not to be regarded as limited by the embodiments described above.

The invention claimed is:

1. A method for controlling a boom for in-flight refueling, of a receiving aircraft from a tanker aircraft that is provided with a telescopic extension and aero-dynamic control surfaces by means of which a function of increase in damping of its displacement is performed by means of a movement of said aerodynamic control surfaces of a magnitude related to the angular velocity of the boom to effect movement of said boom in a direction opposite to that of its displacement, wherein movement of said aerodynamic control surfaces is effected in response to data obtained from at least two sensors of position and/or movement arranged at two positions on the boom located on opposite sides of the locus of maximum displacement of the boom's dominant flexible mode whatever the length L of the telescopic extension and calculation of angular velocity Q unaffected by the resonance of the dominant flexible mode which calculation comprises the following steps:
   a) determining moduli (D1, D2) of the angular deformations of the dominant flexible mode in the sections of the boom in which said at least two sensors are located;
   b) obtaining the angular velocities (Q1, Q2) in the sections of the boom where said at least two sensors are positioned from data supplied by the latter; wherein
   c) said angular velocity Q is obtained as a function of said angular velocities (Q1, Q2) and said moduli (D1, D2), which eliminates the component of the elastic movement of the dominant flexible and wherein said moduli (D1, D2) are determined from measurements performed on the boom proper or from calculations performed with simulation tools.

2. A method for controlling a boom for in-flight refueling of a receiving aircraft from a tanker aircraft that is provided with a telescopic extension and aero-dynamic control surfaces by means of which a function of increase in damping of its displacement is performed by means of a movement of said aerodynamic control surfaces of a magnitude related to the angular velocity of the boom to effect movement of said boom in a direction opposite to that of its displacement, wherein movement of said aerodynamic control surfaces is effected in response to data obtained from at least two sensors of position and/or movement arranged at two positions on the boom located on opposite sides of the locus of maximum displacement of the boom's dominant flexible mode whatever the length L of the telescopic extension and calculation of angular velocity Q unaffected by the resonance of the dominant flexible mode which calculation comprises the following steps:
   a) determining moduli (D1, D2) of the angular deformations of the dominant flexible mode in the sections of the boom in which said at least two sensors are located;
   b) obtaining the angular velocities (Q1, Q2) in the sections of the boom where said at least two sensors are positioned from data supplied by the latter; wherein
   c) said angular velocity Q is obtained as a function of said angular velocities (Q1, Q2) and said moduli (D1, D2), which eliminates the component of the elastic movement of the dominant flexible mode, wherein in the step c), compensation is applied for any delay in obtaining said angular velocities (Q1, Q2) to guarantee that there is, between them, a phase lag of 180° in the natural frequency of the dominant flexible mode.

3. A method for controlling a boom for in-flight refueling of a receiving aircraft from a tanker aircraft that is provided with a telescopic extension and aero-dynamic control surfaces by means of which a function of increase in damping of its displacement is performed by means of a movement of said aerodynamic control surfaces of a magnitude related to the angular velocity of the boom to effect movement of said boom in a direction opposite to that of its displacement, wherein movement of said aerodynamic control surfaces is effected in response to data obtained from at least two sensors of position and/or movement arranged at two positions on the boom located on opposite sides of the locus of maximum displacement of the boom's dominant flexible mode whatever the length L of the telescopic extension and calculation of angular velocity Q unaffected by the resonance of the dominant flexible mode which calculation comprises the following steps:
   a) determining moduli (D1, D2) of the angular deformations of the dominant flexible mode in the sections of the boom in which said at least two sensors are located;
   b) obtaining the angular velocities (Q1, Q2) in the sections of the boom where said at least two sensors are positioned from data supplied by the latter; wherein
   c) said angular velocity Q is obtained as a function of said angular velocities (Q1, Q2) and said moduli (D1, D2), which eliminates the component of the elastic movement of the dominant flexible mode and wherein said velocity Q is obtained as a weighted sum of the angular velocities (Q1, Q2) obtained from the data supplied by said sensors, using for each of them weighting factors (X1, X2) directly proportional to the moduli (D2, D1), respectively, of the angular deformations of the dominant flexible mode in the sections of the boom where the opposite sensor is positioned and inversely proportional to the sum of said moduli (D1, D2).

4. Method for controlling a boom for in-flight refueling according to claim 3, which includes an additional step of validation of said weighting factors (X1, X2) by verifying that they coincide with those that are obtained on replacing the moduli (D1, D2) with the amplitudes (A1, A2) of the angular movement of the dominant elastic mode in the sections of the boom where said sensors are positioned at the frequency Fd of the dominant flexible mode relative to the excitation of the aerodynamic surfaces, said amplitudes (A1, A2) being obtained by means of measurements performed on the boom in flight.

5. A control system of a device for in-flight refueling, of a receiving aircraft from a tanker aircraft that uses a boom, provided with a telescopic extension and aerodynamic control surfaces, that is connected to the tanker aircraft by means of a mechanical linkage that comprises: sensors for measuring parameters of movement and position of said boom and its telescopic extension;

actuators of said aerodynamic control surfaces;

a computerized system for controlling said actuators on the basis of the instructions supplied by a command unit and the data supplied by said sensors that includes a subsystem for performing a function of increase in damping by means of a movement of said aerodynamic control surfaces of a magnitude related to the angular velocity of the boom and in the opposite direction;

wherein:
  a) said subsystem includes a computer program for obtaining the angular velocity Q of the boom unaffected by the resonance of the dominant flexible mode as a function of the angular velocities (Q1, Q2) obtained from the data supplied by at least two sensors and of the moduli (D1, D2) of the angular deformations of the dominant flexible mode in the sections of the boom in which said at least two sensors are located that eliminates the component of the elastic movement of the dominant flexible mode;
  b) said at least two sensors are arranged on the boom in positions that ensure it is located on opposite sides of the valley of the dominant flexible mode whatever the length L of the telescopic extension wherein said moduli (D1, D2) are determined from measurements performed on the boom proper or from calculations performed with simulation tools.

6. A control system of a device for in-flight refueling of a receiving aircraft from a tanker aircraft that uses a boom, provided with a telescopic extension and aerodynamic control surfaces, that is connected to the tanker aircraft by means of a mechanical linkage that comprises: sensors for measuring parameters of movement and position of said boom and its telescopic extension;

actuators of said aerodynamic control surfaces;

a computerized system for controlling said actuators on the basis of the instructions supplied by a command unit and the data supplied by said sensors that includes a subsystem for performing a function of increase in damping by means of a movement of said aerodynamic control surfaces of a magnitude related to the angular velocity of the boom and in the opposite direction;

wherein:
  a) said subsystem includes a computer program for obtaining the angular velocity Q of the boom unaffected by the resonance of the dominant flexible mode as a function of the angular velocities (Q1, Q2) obtained from the data supplied by at least two sensors and of the moduli (D1, D2) of the angular deformations of the dominant flexible mode in the sections of the boom in which said at least two sensors are located that eliminates the component of the elastic movement of the dominant flexible mode;
  b) said at least two sensors are arranged on the boom in positions that ensure it is located on opposite sides of the valley of the dominant flexible mode whatever the length L of the telescopic extension wherein in said computer program, compensation is applied for any delay in obtaining said angular velocities (Q1, Q2) to guarantee that there is, between them, a phase lag of 180° in the natural frequency of the dominant flexible mode.

7. A control system of a device for in-flight refueling of a receiving aircraft from a tanker aircraft that uses a boom, provided with a telescopic extension and aerodynamic control surfaces, that is connected to the tanker aircraft by means of a mechanical linkage that comprises: sensors for measuring parameters of movement and position of said boom and its telescopic extension;

actuators of said aerodynamic control surfaces;

a computerized system for controlling said actuators on the basis of the instructions supplied by a command unit and the data supplied by said sensors that includes a subsystem for performing a function of increase in damping by means of a movement of said aerodynamic control surfaces of a magnitude related to the angular velocity of the boom and in the opposite direction;

wherein:
  a) said subsystem includes a computer program for obtaining the angular velocity Q of the boom unaffected by the resonance of the dominant flexible mode as a function of the angular velocities (Q1, Q2) obtained from the data supplied by at least two sensors and of the moduli (D1, D2) of the angular deformations of the dominant flexible mode in the sections of the boom in which said at least two sensors are located that eliminates the component of the elastic movement of the dominant flexible mode;
  b) said at least two sensors are arranged on the boom in positions that ensure it is located on opposite sides of the valley of the dominant flexible mode whatever the length L of the telescopic extension wherein in said computer program said velocity Q is obtained as a weighted sum of the angular velocities (Q1, Q2) obtained from the data supplied by said sensors, using for each of them weighting factors (X1, X2) directly proportional to the moduli (D2, D1), respectively, of the angular deformations of the dominant flexible mode in the sections of the boom where the opposite sensor is positioned and inversely proportional to the sum of said moduli (D1, D2).

* * * * *